Nov. 29, 1960    TEIJI HASHIMOTO    2,961,934
FOCAL PLANE SHUTTER IN PHOTOGRAPHIC CAMERAS
Filed Jan. 3, 1957

INVENTOR.
TEIJI HASHIMOTO
BY
*Orville*
ATTORNEY

United States Patent Office 2,961,934
Patented Nov. 29, 1960

2,961,934
FOCAL PLANE SHUTTER IN PHOTOGRAPHIC CAMERAS

Teiji Hashimoto, Kawasaki City, Japan, assignor to Canon Camera Company, Inc., Tokyo, Japan, a corporation of Japan Filed Jan. 3, 1957, Ser. No. 632,337
Claims priority, application Japan July 21, 1956
3 Claims. (Cl. 95—57)

This invention relates to a focal plane shutter in photographic cameras, and more particularly to a focal plane shutter of high quality performance at high speed exposures at which the curtain slit is of exceedingly small width.

An object of the invention is to stabilize the exposure slit during the run down of the shutter curtains of a self-capping type focal plane shutter, thus effectively to eliminate uneven exposure at very high shutter speeds, as above mentioned, by maintaining the run-down speed of the shutter curtains highly stable.

Another object is to provide means controlling the exposure slit so as automatically to open the slit an appropriate amount when the shutter is tensioned and to close the slit when the shutter has run down after making an exposure.

Figure 1:
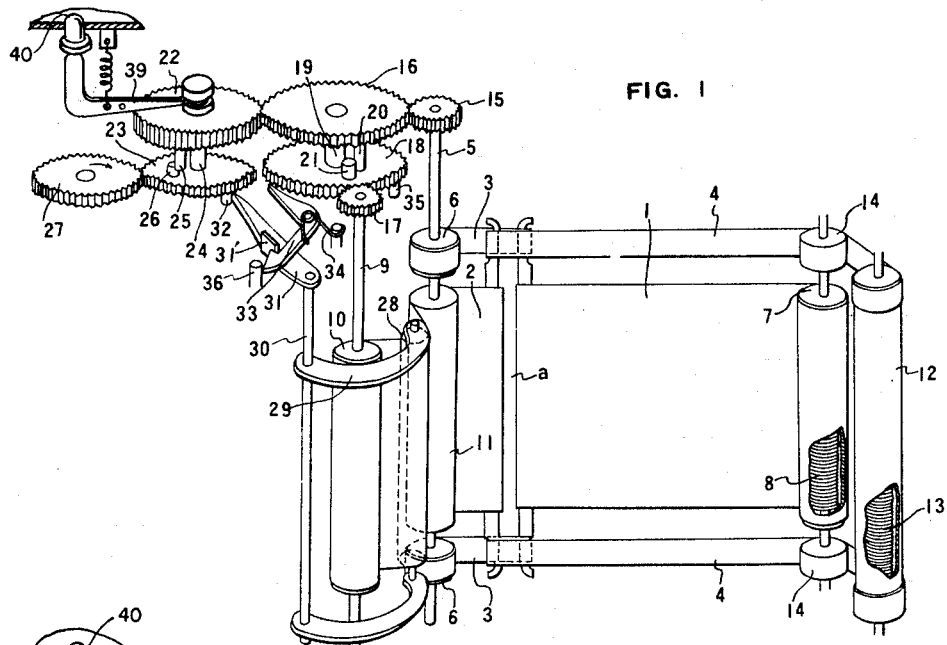
Figure 2:
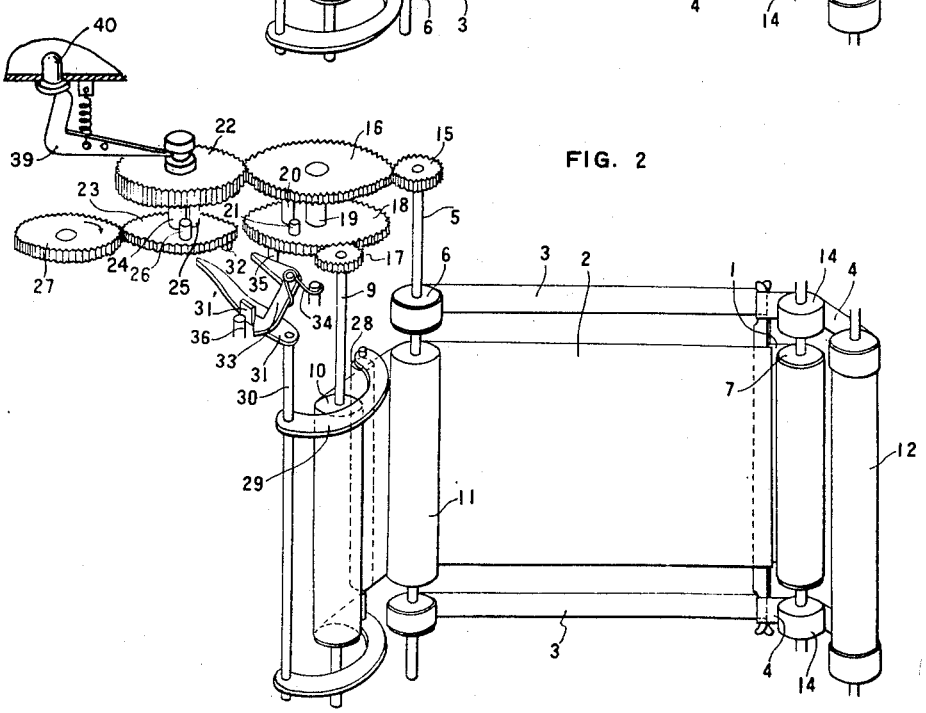

A clearer concept of the scope and purpose of the instant invention may be obtained from the following description and the accompanying drawing, in which:

Fig. 1 illustrates a perspective view of a focal plane shutter according to the instant invention when the shutter curtain is wound; and Fig. 2 illustrates a perspective view of the focal plane shutter when the shutter curtain is rewound.

In the conventional self-capping focal plane shutter device, after winding up the shutter curtains with the slit closed, the first curtain runs down first on making an exposure to produce an exposure slit between the first curtain and the second curtain, and when the curtain slit attains a predetermined width, the second curtain is released to run after the first curtain. However, the aforesaid structure has the drawback that it is apt to produce unevenness in the shutter curtain speed and, more particularly, on making the curtain slit is unstable at exposures of the comparatively faster shutter speeds because even the slightest change in the very narrow slit causes inaccurate exposure, and an unstable slit during exposure causes uneven exposure of the picture.

In the prior art structures, it was very difficult to obtain and maintain an accurate slit at such high shutter speeds and uneven exposure was experienced by many photographers. As is well known, the cause of the difficulty was the slit control mechanism.

To overcome the aforesaid difficulties, the focal plane shutter according to the instant invention is provided with a hauling roller to haul the second curtain so that the hauling roller makes a predetermind slit between the first curtain at the termination of the shutter winding operation. Therefore, a predetermined curtain slit is produced between the first and second curtains when the shutter is tensioned, and on making an exposure the first and second curtains run down with the curtain slit accurately maintained by the hauling roller. It is therefore a particular object of the instand invention to maintain the running down speed of the shutter curtains at a high degree of stability while maintaining the predetermined curtain slit precisely at the proper width, and thus to produce stabilization of the curtain slit during the shutter curtain run down of the self capping type focal plane shutter. The device of my invention effectively eliminates uneven exposure of the sensitized material in the camera, and further enables it to make very high speed exposures of a kind that formerly were never expected of a very highly stable curtain slit.

Referring to the drawing showing a preferred form of my invention as applied to focal plane shutter cameras, 1 is a first shutter curtain and 2 is a second shutter curtain. 3 designates ribbons connected to first shutter curtain 1, and 4 designates ribbons connected to second shutter curtain 2. 5 is a first shutter curtain winding shaft and 6 is a winding drum affixed to first shutter curtain winding shaft 5. 7 is the rewinding roller of first shutter curtain 1, and 8 is the rewinding spring provided in rewinding roller 7. 9 is the winding shaft of second shutter curtain 2, and 10 is a winding drum affixed to second shutter curtain winding shaft 9. 11 is the second shutter curtain guide drum rotatively mounted on first shutter curtain winding shaft 5. 12 is the rewinding roller of second shutter curtain 2, and 13 is a rewinding spring provided in second shutter curtain rewinding roller 12. 14 designates guide rollers of second shutter curtain ribbons 4 rotatively mounted coaxially with first shutter curtain rewinding roller 7. First shutter curtain winding shaft 5 is provided at its upper end with pinion 15 which meshes with a gear 16, and second shutter curtain winding shaft 9 is provided at its upper end with pinion 17 meshing with a gear 18. Gears 16 and 18 are mounted on a common shaft 19 and in coupled relationship with each other by means of pin 20 mounted on gear 16 and a pin mounted on gear 18. 22 and 23 are gears rotatively mounted on a common shaft 24, and more particularly, gear 22 is disposed slidably in the axial direction to form a clutching mechanism by means of a pin 25 mounted on gear 22 and a pin 26 mounted on gear 23. When gear 22 is slid upward pin 25 disengages from pin 26 and permits the shutter curtains to rewind. 27 is a gear meshing with gear 23 and is rotatable in coupled relation with a film winding mechanism operable by a winding knob, a winding lever, or the like.

The arrangement of the gear train and the pin clutch mechanism are well known in the art, see for example British Patent 480,891 to Zeiss Ikon A. G., Figure 1. In instant Figs. 1 and 2, the means for moving gear 22 axially upward on depression of the shutter button are indicated schematically in the form of a pivoted lever 39 which is spring pressed at one end against the shutter release button 40 and coupled at its other end to the upper hub of gear 22, so that on depression of the shutter button the gear 22 is raised sufficiently to disengage pin 25 from pin 26, the engagement between the two pins being restored on the restoring movement of the button 40 and lever 39.

28 is a curtain hauling roller bearing with pressure against second shutter curtain 2 between second shutter curtain guide drum 11 and second shutter curtain winding drum 10. 29 is a hauling arm supporting curtain hauling roller 28, arm 29 extending from shaft 30 having lever 31 secured thereto. 32 is a pin mounted on gear 23 adapted to engage with lever 31 to apply pressure thereto on rotation of gear 23. 33 is a latching member to engage with a projection or upturned ear 31' and exerts a holding action on curtain hauling roller 28 is in its hauling condition with second shutter curtain 2. 34 is a spring mounted on latching member 33. 35 is a pin mounted on gear 18 to release latching member 33 from lever 31 during the rotation of gear 18 by deflecting another arm of latching member 33 against the bias of its spring 34. 36 is a stop member for lever 31 and lever 33.

Having described the structure of the focal plane shutter according to the instant invention, its manner of operation will now be set forth in some detail with reference to Figs. 1 and 2. Before the shutter curtain is wound as illustrated in Fig. 2, pin 35 mounted on gear 18 pushes latching member 33 and lever 31 is disengaged from the hook of lever 33, second shutter curtain hauling roller 28 is thus in its releasing position and exerts no pressure against second shutter curtain 2. When the film winding knob, not shown, is wound, gear 27 is rotated clockwise as shown by the arrow on gear 27 in the figures. Gear 23 meshing with gear 27 rotates gear 22 by the engagement of clutch pins 25 and 26. Gear 16 meshing with gear 22 rotates pinion 15 as the film winding knob is rotated, and simultaneously pinion 17 is also rotated by the engagement of pins 20 and 21 and gear 18 meshing with pinion 17. The gear ratios of these gear trains are such that, as is well known, shutter curtains 1 and 2 are wound up onto their drums in equal amount to complete tensioning of the shutter as the film winding is completed. In this operation, projection 35 is rotated clockwise about shaft 19. Pin 35 engages one end of lever 33 after an exposure, but disengages therefrom as soon as the shutter tensioning and film winding commences. On the other hand, projection 32 on gear 23 does not engage the free end of lever 31 when the shutter is released, as shown in Fig. 2. As the film is wound up, projection 32 makes almost a complete turn, so that it engages one end of lever 31 when the shutter curtains are wound up and turns lever 31 clockwise with shaft 30. The upturned ear 31' will be caught by the hook of lever 33 so that lever 31, under the bias of spring 34, is positioned as shown in Fig. 1. Rotating lever 31 from the position shown in Fig. 2 to that shown in Fig. 1, moves the hauling roller clockwise about shaft 30 against the second curtain 2 and hauls the second curtain with it a predetermined distance to produce slit *a* shown in Fig. 1. Further winding of the film winding knob, further rotates gear 23 and pin 32 passes over the free end of lever 31. Upturned ear 31' is then caught by the hook of lever 33 to hold hauling roller 28 at a predetermined position, as shown in Fig. 1. Slit *a* is maintained at the proper width until the slit has passed over the exposure aperture when the shutter is released to make the exposure. As above stated, when the shutter release button is depressed, gear 22 moves axially upward to disengage pin 25 from pin 26, but even with pins 25 and 26 disengaged from each other, gear 22 still meshes with gear 16. With the clutch pins 25 and 26 disengaged from each other, the gears 22 and 16 are free to rotate under the pull of tensioned drum springs 8 and 13, and therefore the gears coupled to gear 22 are released and the shutter curtains are released to make an exposure. Gear 23, however, does not rotate as it meshes with gear 27 of the film winding mechanism. Then both shutter curtains return to their original positions keeping the aforesaid curtain slit *a* properly spaced until the slit passes the exposure aperture. When pin 35 mounted on gear 18 touches latching member 33, lever 31 is released from latching member 33, releasing the hauling of the second shutter curtain by roller 28. The hauled or pulled portion of the second curtain is now rendered taut by roller spring 13, and the slit closed, as shown in Fig. 2.

Having described the operation of the invention, it will now be apparent that the device according to this invention is to provide a curtain slit produced at an appropriate period by means of a hauling roller acting on the second curtain so that the exposure slit is maintained stable and highly accurate, and even and uniform exposures are obtainable at high speeds formerly considered impossible.

While I have described a preferred embodiment of my invention, certain features are readily applicable to various othe types of shutter mechanism, and I consider as within the scope of the appended claims such applications.

What I claim is:

1. In a focal plane curtain shutter having a first and a second curtain of which the adjacent ends overlap in the untensioned condition of the shutter, the combination of a second curtain guide drum, a second curtain wind-up drum spaced from the guide drum, a hauling roller between and spaced from the guide and wind-up drums, mechanism for rocking the hauling roller against and away from the second curtain in the region thereof between the drums to deflect such second curtain region and withdraw the second curtain end from the adjacent end of the first curtain to form an exposure slit, and rocking mechanism actuating means controlled by the curtain tensioning means to actuate the roller in the curtain deflecting direction when the shutter is fully tensioned and in the opposite direction on completion of an exposure.

2. The combination of claim 1 in which the rocking mechanism actuating means includes a pair of latchable members to maintain the hauling roller in the curtain deflecting position until the exposure has been completed.

3. A focal plane shutter comprising a first curtain, a second curtain, the adjacent ends of the shutter overlapping when the shutter is untensioned, a first shaft, a second shaft, a first-curtain winding drum fixed on the first shaft, a first pinion on the first shaft, a second-curtain guide drum rotatably mounted on the first shaft, a second-curtain windup drum fixed to the second shaft, a second pinion on the second shaft, a first gear meshing with the first pinion, a second gear substantially equivalent to and coaxial with the first gear and meshing with the second pinion, a first pin eccentrically mounted on the first gear, a second pin eccentrically mounted on the second gear and extending into the rotary path of the first pin on engagement therewith to couple the second and first gears, an idler gear meshing with the first gear, a third gear coaxial with the idler gear, a third pin eccentrically mounted on the idler gear, a fourth pin eccentrically mounted on the third gear and extending into the rotary path of the third pin and engagement therewith to couple the third gear to the idler gear, a film winding gear meshing with the third gear adapted on rotation of the film winding gear in the film advancing direction to tension the shutter curtains, a hauling roller positioned between the second-curtain guide drum and the second-curtain wind up drum, a third shaft, a pair of spaced arms integral with the third shaft and rotatably supporting the hauling roller, a first lever integral with the third shaft, a fifth pin projecting downwardly from the third gear and so positioned thereon as to engage the free end of the first lever when the shutter curtains are wound up, a sixth pin projecting downwardly from the second gear, a second angle lever pivoted to the camera body, an upwardly extending projection at an intermediate region of the first lever, and a spring biasing the second angle lever, one arm of the second lever having a hook-shaped end tending under the bias of the spring to latch with the upwardly extending projection of the first lever, the other arm of the second lever extending into the rotary path of the sixth pin so that when the fifth pin engages the free end of the first lever and the hook-shaped end of the second lever is latched to the projection of the first lever the sixth pin is disengaged from such other arm of the second lever to permit the first lever to be rotated in the direction pressing the hauling roller against the second curtain to deflect a portion thereof thus to produce an exposure slit between the second and first curtains, the sixth pin being so positioned on the second gear as to engage the second lever when the shutter has run down thereby disengaging the hook end of the second lever from the upward projection of the first lever to permit rotation of the first lever in the direction rocking the hauling roller away from the second curtain to permit the deflected portion thereof to be realigned between the guide drum and the wind-up drum.

References Cited in the file of this patent
UNITED STATES PATENTS

| | | |
|---|---|---|
| 1,458,211 | Kingsbury | June 12, 1923 |
| 2,335,690 | Morse | Nov. 30, 1943 |